(12) United States Patent
Maricocchi et al.

(10) Patent No.: US 6,254,756 B1
(45) Date of Patent: Jul. 3, 2001

(54) PREPARATION OF COMPONENTS HAVING A PARTIAL PLATINUM COATING THEREON

(75) Inventors: Antonio F. Maricocchi; Roger D. Wustman, both of Loveland; Jonathan P. Clarke, West Chester; Thomas E. Mantkowski, Madeira; David G. W. Fargher, Fairfield; Jeffrey A. Conner, Hamilton, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/373,269

(22) Filed: Aug. 11, 1999

(51) Int. Cl.$^7$ .............................. C25D 5/02; C25D 5/50
(52) U.S. Cl. ......................... 205/97; 205/96; 205/122; 205/136; 205/145; 205/195; 205/228; 205/264
(58) Field of Search .................. 205/96, 97, 118, 205/122, 128, 136, 145, 264, 195, 228

(56) References Cited

U.S. PATENT DOCUMENTS

| 4,001,093 | * | 1/1977 | Koontz et al. ...................... 205/95 |
| 4,028,198 | * | 6/1977 | Tuscher et al. ..................... 205/73 |
| 5,813,118 | * | 9/1998 | Roedl et al. ....................... 29/889.1 |

* cited by examiner

Primary Examiner—Kathryn Gorgos
Assistant Examiner—William T. Leader
(74) Attorney, Agent, or Firm—Andrew C. Hess; David L. Narciso

(57) ABSTRACT

A curved component such as a turbine airfoil, shroud, or combustor centerbody is prepared with a platinum or a platinum-aluminide protective coating over only a portion of the surface thereof. The coating may serve as an environmental coating, or as a bond coat of a thermal barrier coating system. The partial coverage is achieved by depositing platinum only over a portion of the surface of the component, typically including the concave portion in the case of an airfoil, optionally depositing an aluminum layer, and optionally interdiffusing the platinum and aluminum layers.

17 Claims, 5 Drawing Sheets

PREPARATION OF COMPONENTS HAVING A PARTIAL PLATINUM COATING THEREON

FIELD OF THE INVENTION

This invention relates to protective coatings on articles, and, more particularly, to platinum and platinum-aluminide coatings on aircraft components such as airfoils.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forwardly.

The hotter the turbine gases, the more efficient is the operation of the jet engine. There is thus an incentive to raise the turbine operating temperature. However, the maximum temperature of the turbine gases is normally limited by the materials used to fabricate the turbine vanes and turbine blades of the turbine. In current engines, the turbine vanes and blades are made of nickel-based or cobalt-based superalloys that can operate at temperatures of up to 1900–2100° F.

Many approaches have been used to increase the operating temperature limits and operating lives of the airfoils of the turbine blades and vanes. The compositions and processing of the materials themselves have been improved. The articles may be formed as oriented single crystals to take advantage of superior properties observed in certain crystallographic directions. Physical cooling techniques are used. In one widely used approach, internal cooling channels are provided within the components, and cooler air is forced through the channels during engine operation.

In another approach, a protective layer in the form of an environmental coating or a ceramic/metal thermal barrier coating (TBC) system is applied to the airfoil of the turbine blade or turbine vane component, which acts as a substrate. One of the currently known protective layers is a diffusion aluminide layer. A diffusion aluminide protective layer may be formed, for example, by electrodepositing a layer of platinum onto the surface to be protected, depositing a layer of aluminum over the platinum layer, and interdiffusing the two deposited layers.

This protective layer, with no overlying ceramic layer, is useful in intermediate-temperature applications. For higher temperature applications, a ceramic thermal barrier coating layer may be applied overlying the protective layer, to form a thermal barrier coating system. The ceramic thermal barrier coating layer insulates the component from the exhaust gas, permitting the exhaust gas to be hotter than would otherwise be possible with the particular material and fabrication process of the substrate.

Platinum is expensive, and therefore care is taken not to deposit more platinum than necessary. However, in existing practice excessive platinum is still used. There is a need for an improved approach to the preparation of airfoils with a platinum aluminide protective layer, which reduces the use of platinum. The present invention fulfills this need, and further provides related advantages.

BRIEF SUMMARY OF THE INVENTION

The present approach provides a technique for depositing platinum at selected locations of a component such as a turbine blade or turbine vane airfoil, so that the platinum aluminide protective layer is deposited only where needed. Expensive platinum metal is conserved. This technique allows full utilization of the volume within the electrodeposition tank, so that there is no reduction in part throughput. High efficiency and cost reduction in the production operation are thereby achieved. The approach is compatible with further processing procedures.

A method for preparing an article comprises the steps of providing an article precursor having a curved surface with a first portion and a second portion, and positioning a deposition anode in facing relationship to the first portion of the curved surface, so that there is no anode in facing relationship to the second portion of the curved surface. The method further includes electrodepositing a platinum layer from solution onto the article precursor using the deposition anode, with deposition occurring primarily on the first portion of the curved surface.

In one implementation, two airfoil precursors are provided, with each airfoil precursor having a convex suction side and a concave pressure side. The two airfoil precursors are positioned with their convex sides in a facing relationship, and two deposition anodes are respectively positioned in facing relationship to the concave sides of the airfoil precursors. A platinum layer is electrodeposited from solution onto the two airfoil precursors using the two deposition anodes, with deposition occurring primarily on the concave sides and some deposition on the leading edge of the airfoil. Other configurations for electrodeposition onto multiple components may also be utilized.

The article precursor is a metallic article having the shape and substantially the dimensions of the final part, optionally with small dimensional reductions to account for the layers that are deposited in the processing. The article precursor is preferably a turbine blade airfoil or a turbine vane airfoil, but other articles such as a shroud or a combustor center body may be processed using the present approach. The preparation of the article may include depositing an aluminum layer overlying the platinum deposited on the precursor, and interdiffusing the platinum layer and the aluminum layer. The resulting coating serves as an environmental protection layer. To form a thermal barrier coating for even higher-temperature applications, a ceramic layer is deposited overlying the article precursor.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
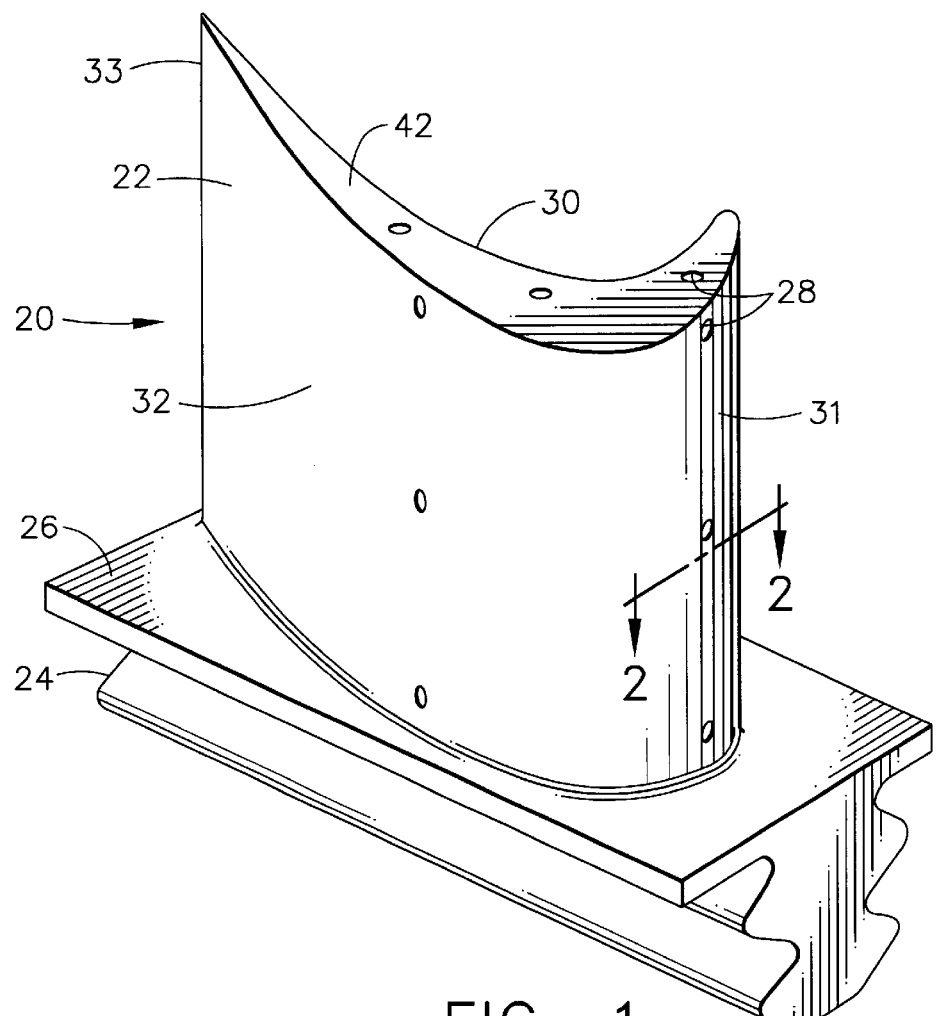
FIG. 1 is a perspective view of a turbine blade.

FIG. 1 depicts a component article of a gas turbine engine such as a turbine blade or turbine vane, and in this illustration a turbine blade 20. The turbine blade 20 includes an airfoil 22 against which the flow of hot exhaust gas is directed. (The turbine vane has a similar appearance in respect to the pertinent airfoil portion.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 meets the dovetail 24. In some articles, a number of cooling channels extend through the interior of the airfoil 22, ending in openings 28 in the surface of the airfoil 22. A flow of cooling air is directed through the cooling channels, to reduce the temperature of the airfoil 22.

As illustrated, the airfoil 22 portion of the turbine blade 20 is curved in an airfoil shape. There is a concavely curved side, termed the concave side 30 (also sometimes known as the "pressure" side of the airfoil), and a convexly curved side, termed the convex side 32 (also sometimes known as the "suction" side of the airfoil). A curved leading edge 31 separates the concave side 30 from the convex side 32 along one longitudinal margin of the airfoil. A more sharply defined trailing edge 33 separates the concave side 30 from the convex side 32 along the other longitudinal margin of the airfoil 22. The airfoil 22 terminates in a tip 42 remote from the dovetail 24. In service, the pressurized hot combustion gas from the combustors is directed against the concave side 30. This concave side 30 therefore requires more protection against the incident hot combustion gas than does the convex side 32. To provide this protection, the concave side 30 is coated with a protective coating, either in the form of an environmental coating or a thermal barrier coating.

Figure 2:
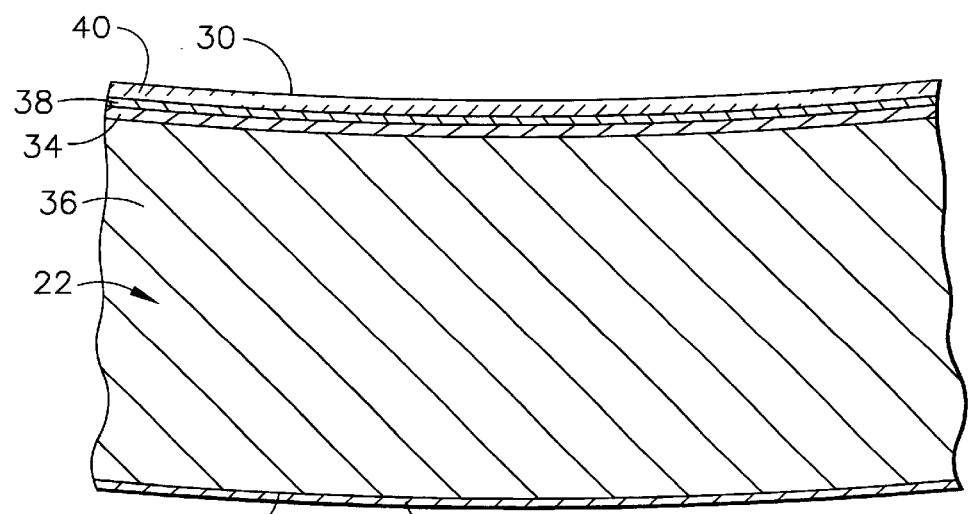
FIG. 2 is a schematic enlarged sectional view through the airfoil of the turbine blade, taken along line 2—2.

FIG. 2 schematically illustrates the airfoil 22 portion, after the protective coating is applied. On the concave side 30, there is a platinum layer 34 adjacent to a substrate 36 made of a base metal. The base metal forming the substrate 36 is typically a nickel-base superalloy such as Rene' N5. The nickel-base superalloy has more nickel than another element, and is usually strengthened by gamma-prime precipitation. Rene' N5 has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. An aluminum layer 38 overlies the platinum layer 34. In practice, the platinum layer 34 and the aluminum layer 38 are deposited as separate layers, but are interdiffused with each other and the substrate 36 so that they merge partially or fully into a single platinum-aluminide layer 34/38. In the illustration, they are shown as the originally deposited layers 34 and 38 to facilitate the subsequent discussion of the deposition processes. On the convex side 32, there is only the aluminum coating 38, or there may be no coating at all. The aluminum coating 38 is typically interdiffused into the substrate 36, but is illustrated as a separate layer for purposes of facilitating the subsequent discussion.

If no further layer is deposited overlying the aluminum layer 38, the platinum aluminide of the layers 34/38 is termed an "environmental coating". The environmental coating may be satisfactory for protecting turbine blades and vanes that are not exposed to the highest temperatures, such as the low-pressure turbine blades and vanes, or other components that are not exposed to high temperatures such as shrouds and center bodies. For those portions of the turbine blades and vanes that are exposed to the highest temperatures, such as the concave sides 30 of the high-pressure turbine blades and vanes, an additional ceramic layer 40 is deposited overlying the aluminum layer 38 (or interdiffused layers 34/38) to provide additional thermal protection. In this structure, the layers 34/38 are termed a "bond coat". The bond coat 34/38 and the ceramic layer 40 are together termed a "thermal barrier coating system".

The ceramic 40, where present, is preferably from about 0.004 inches to about 0.030 inches thick, most preferably from about 0.005 to about 0.015 inches thick. The ceramic layer 40 is operable in thicknesses outside this range, but is less desirable. Lesser thicknesses of the ceramic layer 40 tend to give insufficient insulation to the substrate. Greater thicknesses of the ceramic layer 40 tend to add unnecessary weight to the article. The ceramic layer 40 is preferably yttria-(partially) stabilized zirconia, which is a zirconium oxide-base ceramic material containing from about 4 to about 8 weight percent of yttrium oxide. Other operable stabilizing oxides and ceramic base materials may be used as well.

Figure 3:
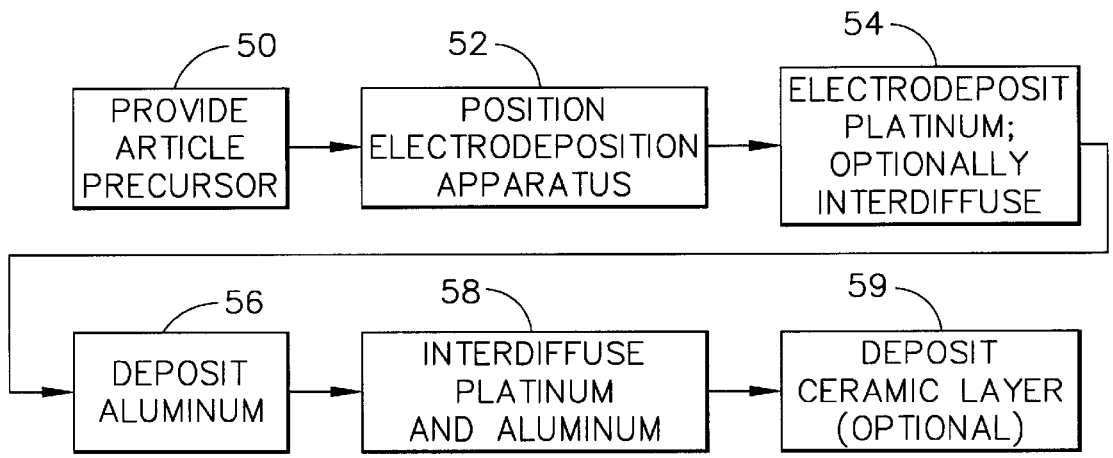
FIG. 3 is a block flow diagram of a method for practicing a first embodiment of the invention.
Figure 4:
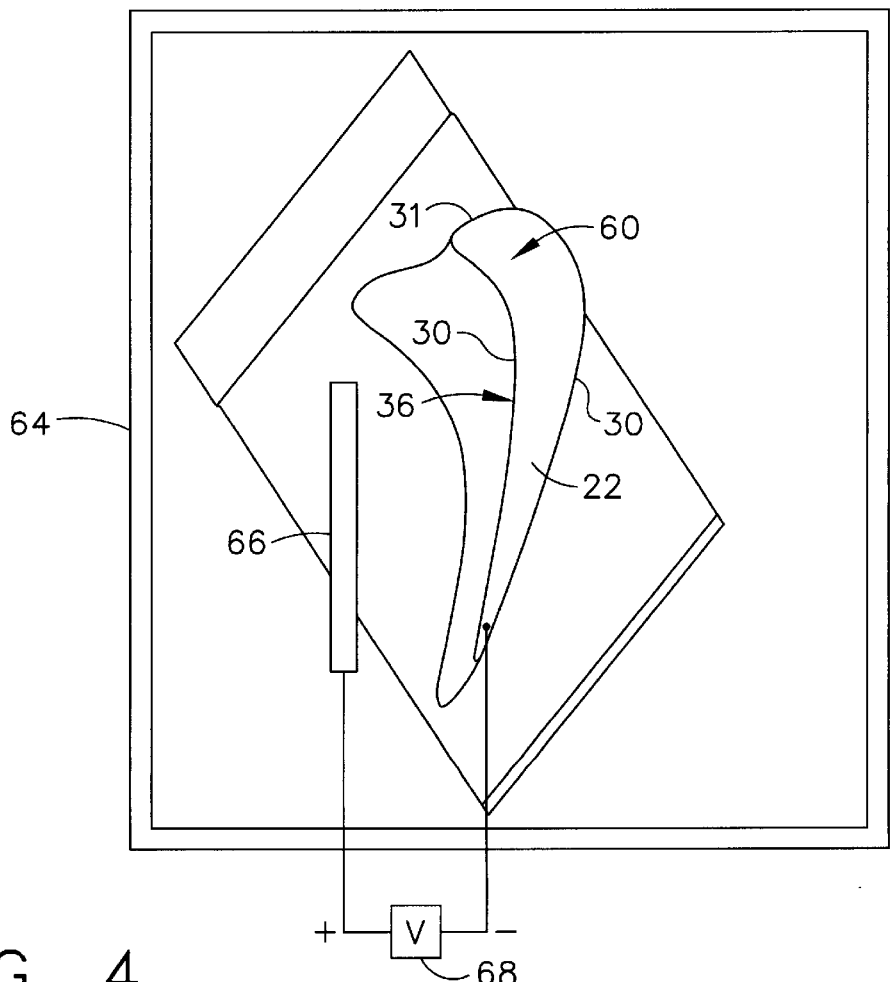
FIG. 4 is a schematic plan view of a mounting arrangement used for the platinum electrodeposition.

FIG. 3 depicts a preferred approach for practicing a first embodiment of the invention, and FIG. 4 illustrates an apparatus used in the platinum electrodeposition. An article precursor 60 is provided, numeral 50. In the illustration of FIG. 4, the article precursor 60 is a turbine blade 22, as illustrated in FIG. 1. The article precursor constitutes the substrate 36, and may be formed of any operable material such as the Rene' N5 material discussed above. The article precursor 60, here the turbine blade 22, is positioned in an electrodeposition apparatus, numeral 52. The electrodeposition apparatus includes an electrodeposition tank 64, an anode 66, and a voltage source 68 that creates an electrical potential between the anode 66 and the substrate 36. The anode 66, illustrated as a flat plate generally coextensive with the concave side 30 in this case, is disposed in a facing relationship to the concave side 30 of the article precursor 60 serving as the substrate 36. The anode 66 is typically made of an electrically conductive material such as platinum-clad or platinum-plated titanium or niobium, and is positioned in close proximity to the concave side 30, typically about ⅛ inch to ½ inch from the substrate 36.

Figure 5:
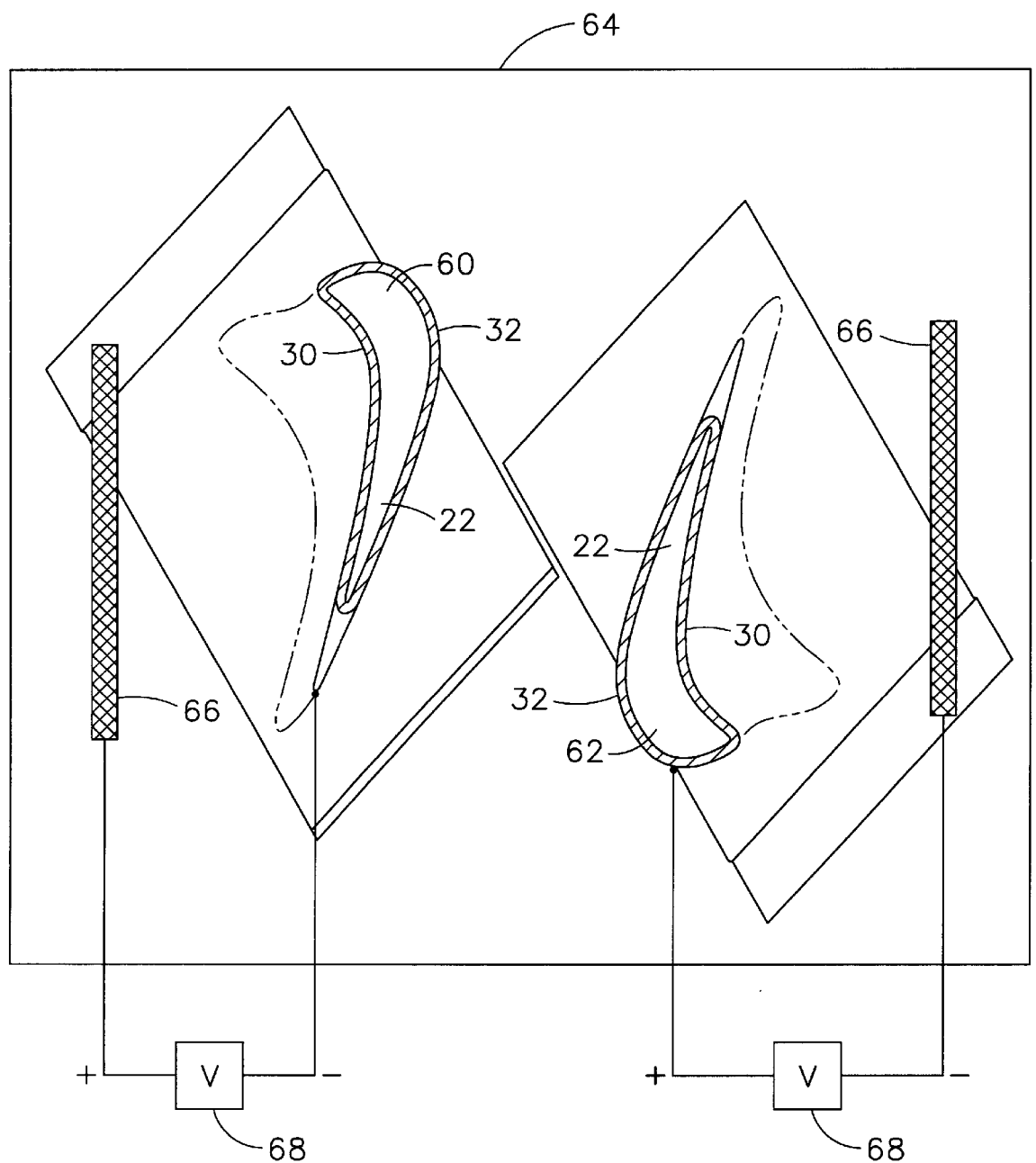
FIG. 5 is a schematic plan view of a second mounting arrangement used for the platinum electrodeposition.

FIG. 5 illustrates another embodiment. In this case, two airfoil precursors 60 and 62 are mounted in the electrodeposition tank 64. The two airfoil precursors 60 and 62 are positioned with their respective convex sides 32 in a facing relationship to each other, which may be viewed as a "back-to-back" relationship. One of the anodes 66 is positioned in facing relationship to the concave side 30 of each of the two airfoil precursors 60 and 62. The structure of the embodiment of FIG. 5 is otherwise similar to that of FIG. 4, and the above description of the embodiment of FIG. 4 is incorporated here.

Figure 6:
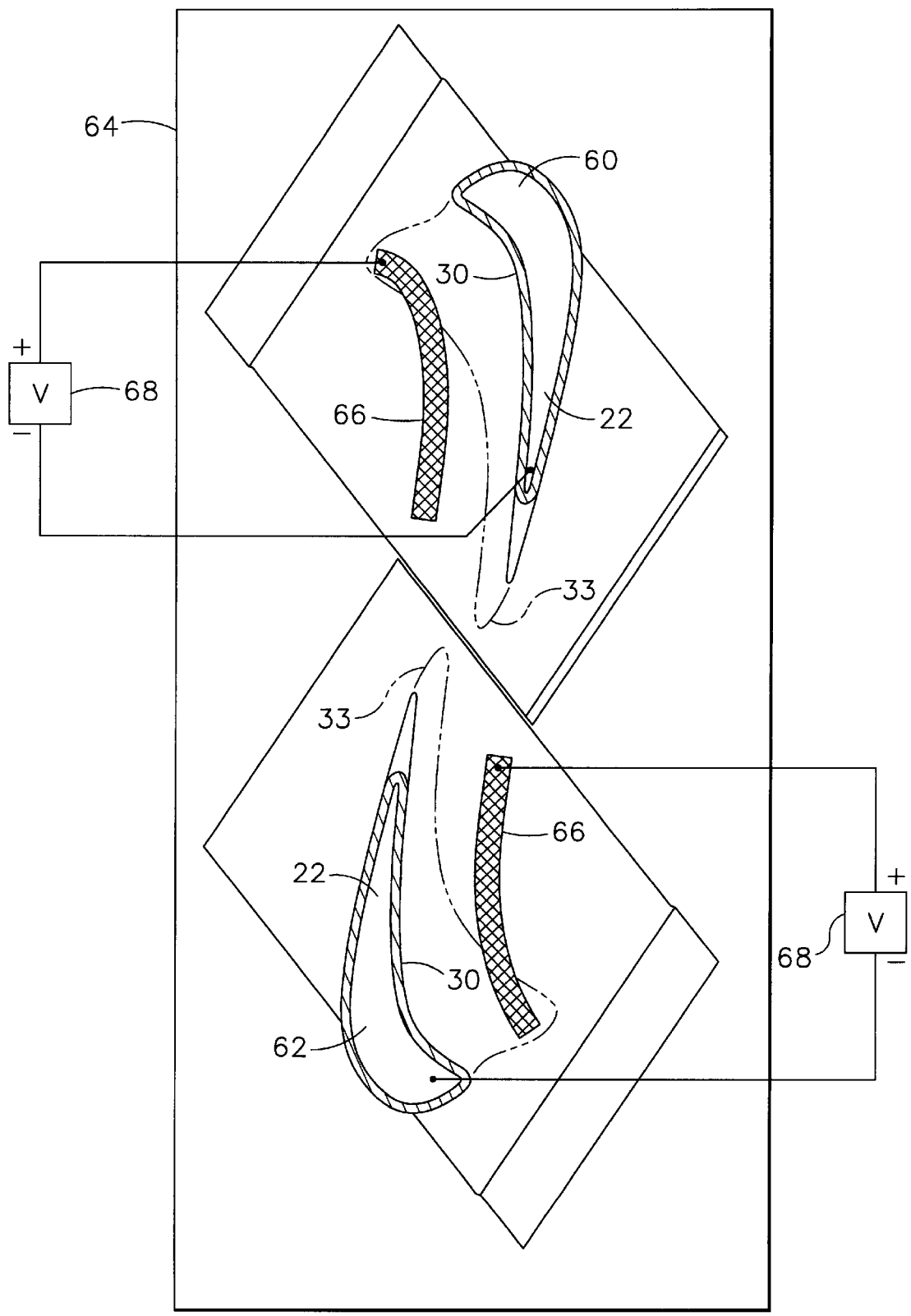
FIG. 6 is a schematic plan view of a third mounting arrangement used for the platinum electrodeposition.

FIG. 6 illustrates yet another embodiment, where two airfoils 60 and 62 are positioned linearly in a configuration with their trailing edges 33 adjacent and the concave sides 30 facing in opposite directions. The anodes 66 are placed in facing relationship to the concave sides 30. In this case, the anodes 66 are curved to approximate the curvature of the concave sides 30. The structure of the embodiment of FIG. 6 is otherwise similar to that of FIG. 4, and the above description of the embodiment of FIG. 4 is incorporated here.

The embodiments of FIGS. 4–6 may be extended to include additional articles or sets of articles in the single electrodeposition tank 64.

In all of the embodiments, the voltage/current source 68 is connected between each of the airfoil precursors 60 and 62, and its respective anode 66. Equivalently, a single voltage/current source 68 may be used.

The platinum layer 34 is deposited, numeral 54. The deposition is accomplished by placing a platinum-containing solution into the tank 64 and depositing platinum from the solution onto the airfoil precursors 60 and 62. An operable platinum-containing aqueous solution is $Pt(NH_3)_4HPO_4$ having a concentration of about 4–20 grams per liter of platinum, and the voltage/current source 68 is operated at about ½–10 amperes per square foot of facing article surface. The platinum layer 34 about 5 micrometers thick is deposited in 1–4 hours at a temperature of 190–200° F.

Because of the positioning of the airfoil precursor 60 and its anode 66 (and, wherein present, the airfoil precursor 62 and its respective anode), the great majority of the platinum is deposited on the concave side 30 of the airfoil precursors 60 (and 62). Some platinum is also deposited on the leading edge 31, which is acceptable. The convex side 32 is partially screened from deposition. An incidental amount of platinum which may be deposited on the convex sides 32 is not damaging and consumes very little platinum. In the embodiment of FIG. 5, the two facing convex sides 32 of the airfoils also aid in screening the deposition of platinum.

Optionally, the platinum layer 34 may be interdiffused into and with the substrate 36 after the electrodeposition is complete but as part of step 54, prior to the next step. If this pre-aluminiding interdiffusion step is performed, interdiffusion is accomplished by heating to a temperature of from about 1500° F. to about 2210° F., and for a time of from about 2 minutes to about 4 hours.

The aluminum layer 38, if used, is deposited overlying the platinum layer 34 (or interdiffused platinum/substrate region), numeral 56. The aluminum layer 38 is deposited by any operable approach, with vapor deposition preferred. In that approach, a hydrogen halide gas, such as hydrogen chloride, is contacted with aluminum metal or an aluminum alloy to form the corresponding aluminum halide gas. Other elements may be doped into the aluminum layer from a corresponding gas, if desired. The aluminum halide gas contacts the airfoil precursor 60, depositing the aluminum thereon. The deposition occurs at elevated temperature such as from about 1825° F. to about 1975° F. so that the deposited aluminum atoms interdiffuse into the platinum layer 34 (or interdiffused platinum/substrate region) during a 4 to 20 hour cycle. This technique allows alloying elements to be deposited into the aluminum layer 38 if desired, from the halide gas. In this process, the aluminum layer 38 is also deposited on the convex side 32. Such deposition of aluminum on the convex side 32 is not harmful, and in fact forms a beneficial diffusion aluminide layer on the convex side 32 which resists oxidation in this less demanding region of the article. Aluminum is inexpensive.

A significant amount of interdiffusion of the platinum layer 34, the aluminum layer 38, and the substrate 36 is achieved during the aluminum deposition step 56. Additional interdiffusion may be accomplished if desired by maintaining the structure at elevated temperature after the flow of halide gas is discontinued, numeral 58.

The interdiffused platinum and aluminum layers form a protective layer that inhibits oxidation and corrosion damage to the airfoil 22, during exposure at intermediate temperatures. This protective layer is an environmental layer.

If further protection is required because the airfoil is to be used at very high temperatures, the ceramic layer 40 is deposited, numeral 59. The ceramic layer 40 is typically applied only over the concave side 30 and thence over the interdiffused platinum-aluminide coating, but it could be applied over the convex side 32 if desired. The ceramic layer 40 may be applied by any operable technique, with electron beam physical vapor deposition (EB-PVD) being preferred for the preferred yttria-stabilized zirconia coating. The EB-PVD processing may be preceded and/or followed by high-temperature processes that may affect the distribution of elements in the bond coat. The EB-PVD process itself is typically conducted at elevated temperatures.

Figure 7:
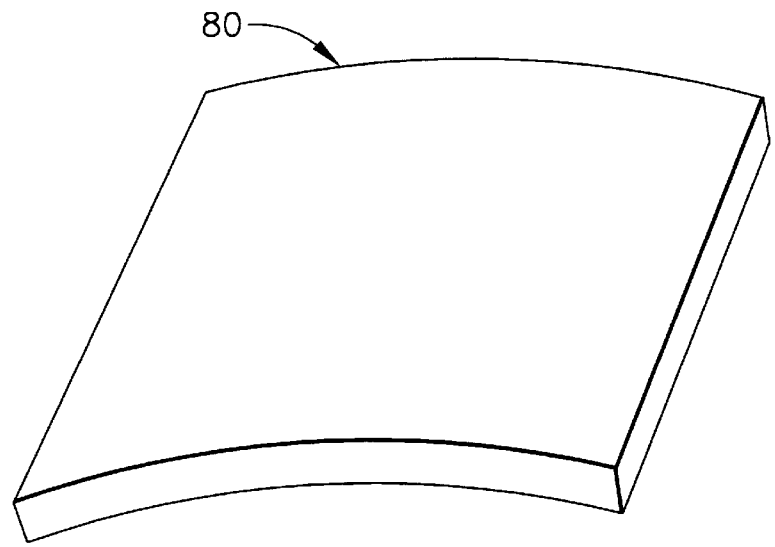
FIG. 7 is a perspective view of an engine shroud.
Figure 8:
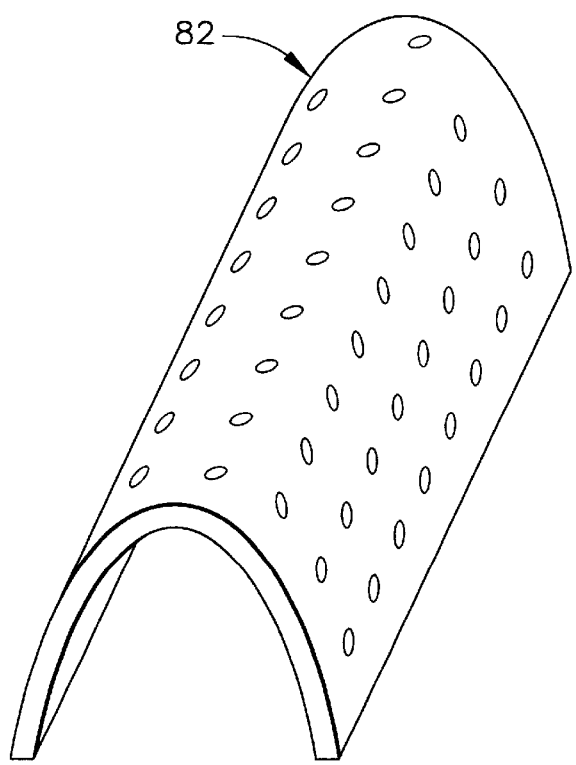
FIG. 8 is a perspective view of a combustor center body.

The preceding discussion focused on deposition on a gas turbine airfoil. Other elements may be similarly processed, such as a gas turbine shroud 80 illustrated in FIG. 7 or a gas turbine center body 82, illustrated in FIG. 8.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing an article, comprising the steps of:
   providing an airfoil article precursor having a curved surface with a concavely curved first portion and a convexly curved second portion;
   positioning a deposition anode in facing relationship to the concavely curved first portion of the curved surface, so that there is no anode in facing relationship to the convexly curved second portion of the curved surface; and
   electrodepositing a platinum layer from solution onto the article precursor using the deposition anode, with deposition occurring primarily on the concavely curved first portion of the curved surface.

2. The method of claim 1, wherein the article precursor is selected from the group consisting of a turbine blade airfoil and a turbine vane airfoil.

3. The method of claim 1, wherein the deposition anode is substantially flat.

4. The method of claim 1, wherein the deposition anode is curved.

5. The method of claim 1, wherein the deposition anode is curved with substantially the same curvature as the first portion of the curved surface.

6. The method of claim 1, including an additional step, after the step of electrodepositing, of
   interdiffusing the platinum layer and a base metal of the article precursor.

7. The method of claim 1, including an additional step, after the step of electrodepositing, of
   depositing an aluminum layer overlying at least a portion of the article precursor.

8. The method of claim 1, including an additional step, after the step of electrodepositing, of
   depositing an aluminum layer overlying the platinum layer on the article precursor.

9. The method of claim 8, including an additional step, after the step of depositing aluminum, of
   interdiffusing the platinum layer, the aluminum layer, and a base metal of the article precursor.

10. The method of claim 8, including an additional step, after the step of depositing an aluminum layer, of depositing a ceramic layer overlying all layers previously deposited on the airfoil precursor.

11. A method for preparing an article, comprising the steps of:

providing an article precursor having a curved surface with a first portion and a second portion;

providing a second article precursor having a second-article curved surface, a first portion of the second-article curved surface and a second portion of the second-article-curved surface;

positioning the article precursor and the second article precursor such that the second portion of the curved surface and the second portion of the second-article curved surface are in a facing relationship;

positioning a deposition anode in facing relationship to the first portion of the curved surface, so that there is no anode in facing relationship to the second portion of the curved surface;

providing a second deposition anode;

positioning the second deposition anode in facing relationship to the first portion of the second-article curved surface;

electrodepositing a platinum layer from solution onto the article precursor using the deposition anode, with deposition occurring primarily on the first portion of the curved surface; and electrodepositing a second platinum layer from solution onto the second article precursor using the second deposition anode, with deposition occurring primarily on the first portion of the second-article curved surface.

12. The method of claim 11, wherein the steps of electrodepositing a platinum layer and electrodepositing a second platinum layer are performed concurrently.

13. The method of claim 11, wherein the article precursor is a first airfoil and the second article precursor is a second airfoil.

14. The method of claim 11, wherein the article precursor and the second article precursor are each selected from the group consisting of a turbine blade airfoil and a turbine vane airfoil.

15. The method of claim 11, wherein the first portion of the curved surface is a first concave surface and the first portion of the second-article curved surface is a second concave surface.

16. A method for preparing a group of articles, comprising the steps of:

providing at least two airfoil article precursors in a single electrodeposition tank, each airfoil article precursor having a curved surface with a concavely curved first portion and a convexly curved second portion;

positioning a separate deposition anode in facing relationship to the concavely curved first portion of the curved surface of each of the airfoil article precursors, so that there is no anode in facing relationship to the convexly curved second portion of the curved surface of each of the airfoil article precursors; and electrodepositing a platinum layer from solution onto the airfoil article precursors using the deposition anodes, with deposition occurring primarily on the concavely curved first portion of the curved surface of each of the article precursors.

17. The method of claim 16, wherein each of the article precursors is selected from the group consisting of a turbine blade airfoil and a turbine vane airfoil.

* * * * *